US008703220B2

(12) United States Patent
Caldwell

(10) Patent No.: US 8,703,220 B2
(45) Date of Patent: *Apr. 22, 2014

(54) SHAPED-POTATO SANDWICH PRODUCT

(76) Inventor: Russell L. Caldwell, Garden Prairie, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/320,324

(22) Filed: Dec. 16, 2002

(65) Prior Publication Data

US 2004/0115312 A1 Jun. 17, 2004

(51) Int. Cl.
*A23L 1/00* (2006.01)

(52) U.S. Cl.
USPC ............... 426/102; 426/92; 426/94; 426/275; 426/383; 426/637

(58) Field of Classification Search
USPC ............ 426/92, 94, 102, 275, 383, 637
See application file for complete search history.

(56) References Cited

U.S. PATENT DOCUMENTS

| 2,373,781 | A | * | 4/1945 | Richardson | 452/141 |
| D254,936 | S | * | 5/1980 | Saunders | D1/199 |
| 4,608,262 | A | * | 8/1986 | Galland | 426/243 |
| D296,377 | S | * | 6/1988 | Skiver et al. | D1/199 |
| 4,765,998 | A | * | 8/1988 | Pak et al. | 426/92 |
| 4,879,125 | A | * | 11/1989 | Pak | 426/120 |
| 4,919,946 | A | * | 4/1990 | Pak et al. | 426/89 |
| 5,702,741 | A | * | 12/1997 | Reutimann | 426/92 |
| 2002/0150656 | A1 | * | 10/2002 | Farnsworth et al. | 426/94 |

FOREIGN PATENT DOCUMENTS

EP 320057 A2 * 6/1989 ............. A23L 1/217

OTHER PUBLICATIONS

Bob Bobala, "Pickle Fribble: The Dill Apocalypse," http://www.fool.com/Fribble/1998/Fribble981014.htm, Oct. 14, 1998.*
Lentil-Potato Burgers. RFVC Digest. vol. 94. Issue: 181. 1994. http://www.recipesource.com/main-dishes/burgers/vegetarian/lentil-potato-burgers1.html.*
Recipe Source website. Lentil-Potato Burgers. Jul. 23, 2001 "shapshot" of website. http://web.archive.org/web/20010723035844/http://www.recipesource.com/main-dishes/burgers/vegetarian/lentil-potato-burgers1.html.*

* cited by examiner

*Primary Examiner* — Anthony Weier
(74) *Attorney, Agent, or Firm* — Reinhart Boerner Van Deuren P.C.

(57) ABSTRACT

A sandwich-sized shaped potato products adapted for presentation and use as either a hot garnish, such as suggestive of a pile of mashed french fries on a hamburger sandwich, or as a meat substitute in a sandwich, and the sandwiches made therewith.

21 Claims, 6 Drawing Sheets

SHAPED-POTATO SANDWICH PRODUCT

CROSS-REFERENCES TO RELATED APPLICATIONS

None.

STATEMENT REGARDING FEDERALLY SPONSORED RESEARCH OR DEVELOPMENT

Not Applicable.

REFERENCE TO MICROFICHE APPENDIX

Not Applicable.

BACKGROUND OF THE INVENTION

1. Field of Invention

The present invention relates generally to food products.

More particularly, the invention relates to sandwich products in the form of shaped-potato product provided as a sandwich garnish or as a sandwich focal point, and sandwiches made with such products.

2. Description of Prior Art

Sandwiches of all kinds, both hot and cold, are popular food products in our society. For example, many individuals enjoy the taste of french fries on a hot sandwich such as a hamburger. The common method to achieve such culinary delight is to place a pile of french fries in the sandwich, and then mash the fries to maintain the fries in position while eating the sandwich. However, there are certain drawbacks and disadvantages to this scenario. A diner will need to purchase or prepare an order of french fries, even if he or she does not want additional french fries with the sandwich. And the process can be generally messy, requiring the diner to open the sandwich, balance the french fries on the sandwich until the top piece of bread is returned into position, and mash the bread in order to set and hold the position of the fries in the sandwich.

A pre-made french fry potato sandwich garnish and the sandwich made therewith a would help to eliminate these drawbacks and disadvantages, and would provide the diner with an easy to handle, unique sandwich, thus satisfying an ever-present demand for related culinary innovations. However, a pre-made french fry potato garnish specially adapted for use with sandwiches is currently not known or available.

One prior fried shaped-potato sandwich product that suggests elimination of the need to place a pile of french fries on a sandwich in order to achieve the french fry sandwich experience is illustrated in Pak et al., U.S. Pat. Nos. 4,765,998, 4,879,125 and 4,919,946. Briefly, these patents show an edible food bowl that the patents indicate may be made with a fried potato composition, and that is placed in a sandwich to hold additional sandwich ingredients. However, use of this bowl without additional ingredients is not suggested in these patents, nor would such use be practical or desirable from a culinary standpoint as it would result in the diner eating an empty bowl that is positioned in the sandwich.

In addition, many health conscious individuals are reducing their consumption of meat, particularly red meat. As a result, there has been a rise in the production of meat substitute products such as in the form of burgers made from vegetable products. Soy is the most common meat substitute from which focal-point sandwich products are currently made. Soy-based products, however, tend to suffer from the presence of a distinctive, generally non-pleasing soy odor and taste. Soy is also well known to be used as a low cost extender in ground meat and shredded meat products. These and other factors have contributed to limited acceptance of sandwiches made with soy-based products as a meat substitute in a sandwich. Consequently, there is also a need for a new meat substitute product and sandwich made therewith that does not suffer from the disadvantages of soy-based sandwich products.

SUMMARY OF THE INVENTION

The general aim of the present invention is to provide new and unique sandwich products in the form of shaped-potato sandwich products, and the sandwiches made therewith.

More particularly, the invention relates to shaped-potato sandwich products in the form of shaped-potato product provided as a sandwich garnish or as a sandwich focal point, and sandwiches made with such products.

A detailed objective of the invention is to provide a shaped-potato sandwich product in the form of either a sandwich garnish or as the focal-point of a sandwich.

Another detailed objective is to provide a shaped-potato sandwich product that provides a more pleasant dining experience as compared with prior shaped-potato sandwich products and processes.

These and other objectives and advantages of the invention will become more apparent from the following detailed description when taken in conjunction with the accompanying drawings.

Briefly, in accordance with one aspect of the invention, there is provided a sandwich product comprising two pieces of bread, such as two slices of bread or a two-part bun, and a cooked, shaped-potato product disposed between the pieces of bread. The shaped-potato product is provided as generally bun sized and shaped for complimentary use in a bun sandwich, or generally sliced-bread sized and shaped for use in a sliced bread sandwich. The shaped-potato product is further provided with a substantially constant cross-section and with color, flavor, and surface presentations as desired to enhance the dining experience.

In accordance with another aspect of the invention, there is provided a sandwich product comprising two pieces of bread, and a generally closed-form shaped-potato product disposed between said bread portions. The shaped-potato product is characterized as having (i) opposing, substantially parallel top and bottom faces for contacting relation with the slices of bread and sized at one of (a) between approximately three (3) to four and one-half (4½) inches in diameter, and (b) between approximately three (3) to four (4) inches by four (4) to five (5) inches rectangular, and (ii) encircling terminal sides extending between said top and bottom faces, said terminal sides being between approximately one-eight (⅛) to five-eights (⅝) inch thick. In one preferred embodiment, the sides of the shaped-potato product are more particularly sized at between approximately one-fourth (¼) to five-eights (⅝) inch thick, and further includes a flavor selected from the group consisting of beef, pork, chicken, turkey, sausage and fish for use as the focal point of the sandwich. In an alternate preferred embodiment, the sandwich product further includes a meat product located between the bread shaped-potato product, and the sides of the potato product are sized at between approximately one-eight (⅛) to three-eights (⅜) inch thick for use as a garnish in the sandwich. The potato garnish is provided in a desired form, and may optionally include additional garnish, condiment, sauce, spice, seasoning or other flavor such as lettuce, tomato, onion, pickle, relish, cheese, smoke, salsa, sour cream, ketchup, mustard, bacon, horseradish, barbecue, mayonnaise, salt, pepper, honey, garlic, lemon, parmesan, butter, malt and vinegar.

In accordance with yet another aspect of the invention, a sandwich product includes a sandwich-sized shaped-potato garnish having surface and flavor presentation suggestive of a pile of mashed french fries.

In accordance with yet another aspect of the invention, a sandwich product includes a sandwich-sized shaped-potato product having surface and flavor presentation suggestive of formed ground beef, and optionally provided with a pre-browned surface presentation with or without grill-marks.

In accordance with still another aspect of the invention, a sandwich product is provided comprising an elongated potato-dog product characterized as having (i) opposing ends, and (ii) enclosing elongated sides extending between said ends, the sides being spaced at between approximately one-half (½) to one and one-fourth (1¼) inch and being between approximately five (5) to seven (7) inches long. The potato-dog product preferably includes a flavor selected from the group consisting of beef, pork, chicken and turkey, and is sized to be complimentary to a hotdog bun. In certain alternate embodiments, this sandwich product further includes a potato-wrap encircling the potato-dog product, the potato-wrap having a flavor selected from the group consisting of flour and corn meal. In this instance, the sandwich product is optionally provided with a stick extending axially from one end of the potato-dog product to establish a potato-corn dog product. In other alternate embodiments, the potato-dog product is formed having a cross-section establishing elongated valleys for holding condiments.

These and other embodiments and aspects of the invention are shown and described in further detail below.

BRIEF DESCRIPTION OF THE DRAWINGS

FIGS. 6, 7, and 8 are perspective, top and side views, respectively, of an alternate embodiment sandwich garnish.

Figure 1:
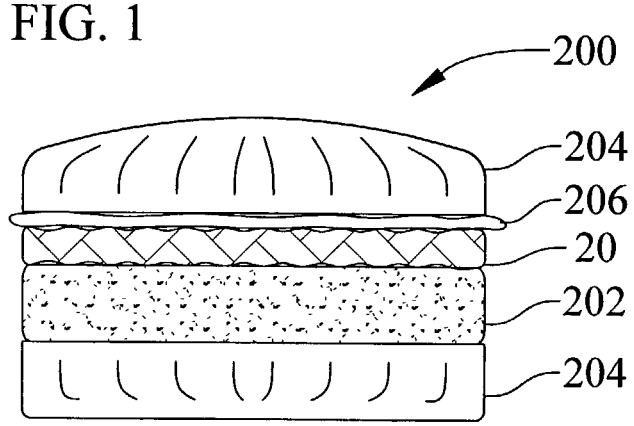
FIG. 1 is a side view of a shaped-potato sandwich product in accordance with the invention and provided with the shaped-potato garnish shown in FIGS. 6, 7, and 8.

While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

The present invention relates to cooked potato products that are sized and shaped for presentation and use as either a hot garnish on a sandwich, or as the focal point or meat substitute of a sandwich, and to sandwiches made with such garnish and focal-point products.

Figure 2:
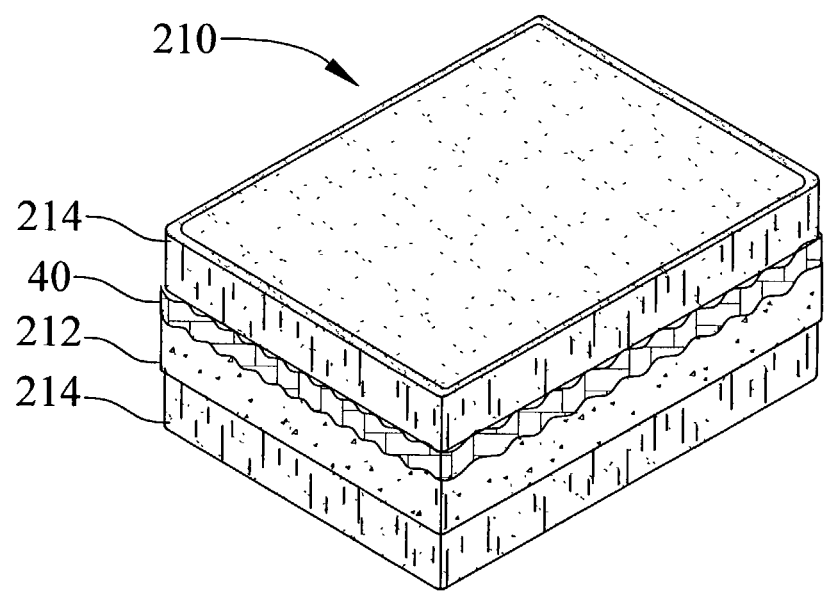
FIG. 2 is a perspective view of an alternate sandwich provided with the garnish shown in FIGS. 12, 13, and 14.
Figure 3:
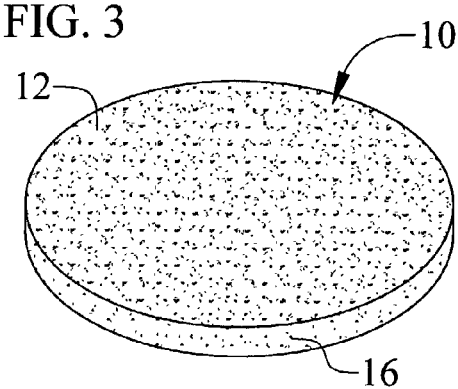
FIGS. 3, 4, 5, and 6 are perspective, top and side views, respectively, of a shaped-potato sandwich garnish in accordance with the invention.
Figure 6:
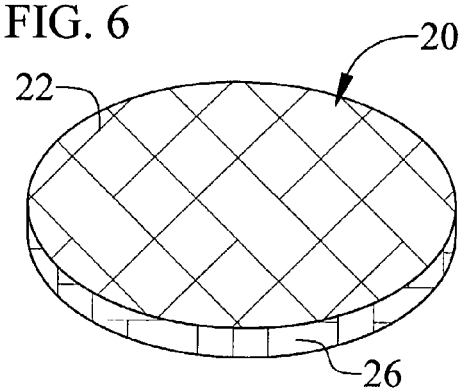
Figure 4:
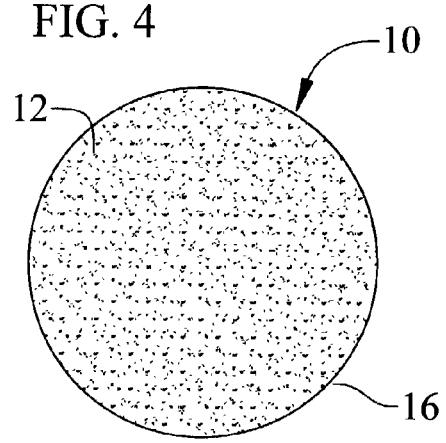
Figure 7:
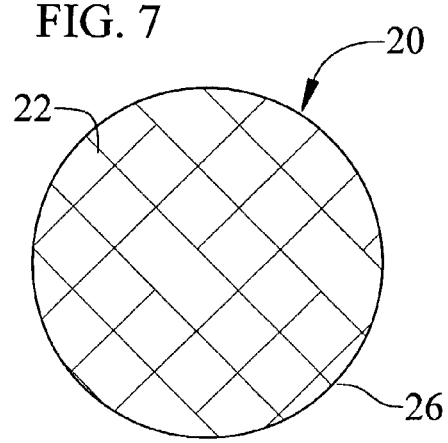
Figure 5:
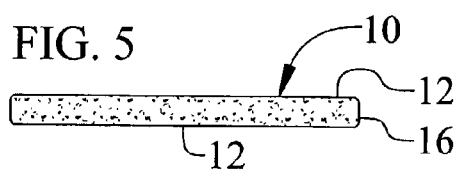
Figure 8:
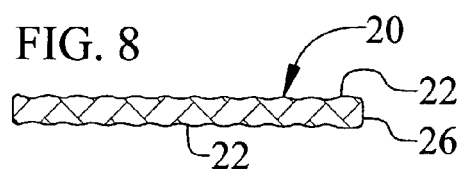
Figure 9:
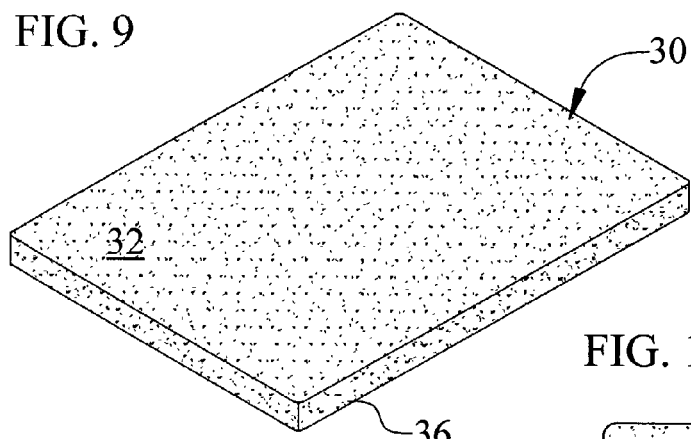
FIGS. 9, 10, and 11 are perspective, top and side views, respectively, of a third embodiment sandwich garnish.
Figure 10:
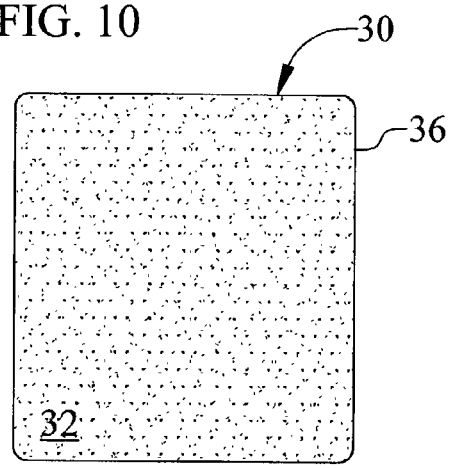
Figure 13:
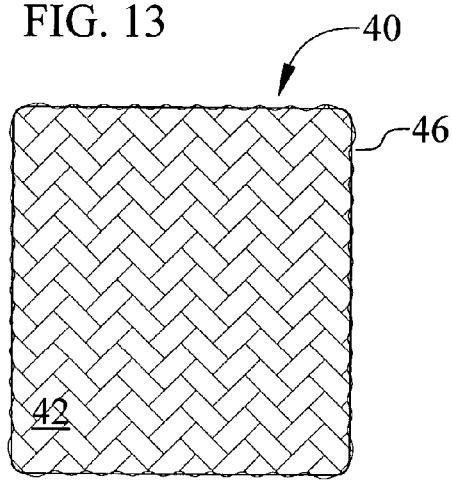
FIGS. 12, 13, and 14 are perspective, top and side views, respectively, of a fourth embodiment sandwich garnish.
Figure 11:
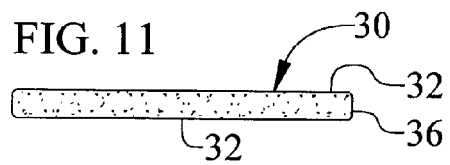
Figure 14:
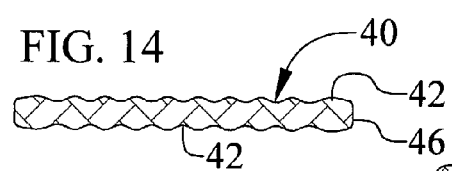
Figure 12:
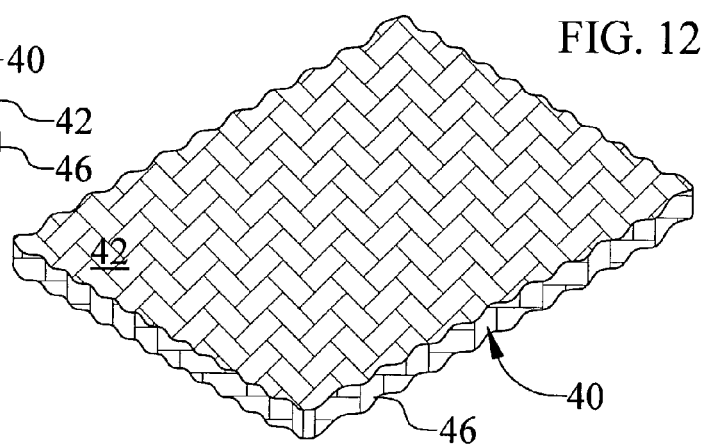

In accordance with one aspect of the invention, a meat sandwich is provided with a generally flat, shaped-potato garnish. For purposes of illustration, a hamburger sandwich 200 in accordance with the invention is shown in FIG. 1, and a bread sandwich 210 is shown in FIG. 2. The hamburger sandwich 200 includes a conventional hamburger 202 located in a two-part hamburger bun 204, and is provided with lettuce garnish 206. The bread sandwich 210 includes a generally rectangular meat product 212, such as a square hamburger, located between two pieces of sliced bread 214. In carrying out the invention, the sandwich 200 is further provided with a potato garnish 20 positioned between the hamburger and the bun, and the sandwich 210 is further provided with a similarly positioned potato garnish 40.

Preferred embodiment potato garnishes in accordance with the invention are shown in the drawings as generally round garnishes 10 and 20 in FIGS. 3-5 and FIGS. 6-8, respectively, and as generally rectangular garnishes 30 and 40 in FIGS. 9-11 and FIGS. 12-14.

The potato garnishes 10, 20, 30 and 40 are formed as generally flat, substantially closed form products, with oppositely facing, generally parallel and planar extending top and bottom faces 12, 22, 32, 42, respectively, the product being further characterized by the absence of upstanding sides extending from the top face, to establish substantial face-to-face contacting relation with the meat and bread, and/or additional garnish products in a sandwich, and encircling terminal sides 16, 26, 36, 46 extending between the top and bottom faces to define the perimeter of the respective garnish. The garnishes are relatively thin, established at a substantially constant thickness between the top and bottom faces of between approximately one-eighth (⅛) to three-eights (⅜) inch.

The shaped-potato garnishes are sized to extend to proximate the perimeter of conventional sized sandwiches, as defined by the perimeter of the bread portions in the sandwich, and to generally fill the spaced surrounded by the perimeter of the sandwich for a shaped-potato garnish presence throughout the sandwich. More particularly, the garnishes 10 and 20 are generally hamburger bun sized, and are particularly characterized as sized at between approximately three (3) to four and one-half (4½) inches in diameter (when viewed from above as in FIGS. 4, 7) for use in a hamburger bun sandwich. The garnishes 30 and 40 are generally slice bread sized, and are particularly characterized as sized at between approximately three (3) to four (4) inches by four (4) to five (5) inches rectangular for use in a bread sandwich, or with rectangular hamburgers such as sold by Wendy's Old Fashioned Hamburgers®.

The shaped-potato garnishes are provided with surface presentation including a natural or pre-browned potato color or specialty color(s), and desired surface texture. Garnishes 10 and 30 are provided with a relatively smooth, yet slightly stippled or dimpled surface texture. Garnishes 20 and 40 are provided with a waffle or criss-cross surface pattern such as similar to a pile of mashed french fries. The shaped-potato garnishes may be provided with alternate surface presentations, such as with a random surface presentation.

The potato garnishes are further provided with flavor presentation of a natural potato flavor, with a meat flavor such as beef, pork, chicken, turkey or sausage, and/or with a garnish, condiment, sauce, spice, seasoning or other additional flavor, such as lettuce, tomato, onion, pickle, relish, cheese, smoke, salsa, chili, sour cream, ketchup, mustard, bacon, horseradish, barbecue, mayonnaise, salt, pepper, honey, lemon, garlic, parmesan, butter, malt and vinegar flavors.

In general, the potato garnishes are preformed as shown, processed, preserved, packaged and delivered to the user in either a raw, a partially cooked, or a fully cooked condition. In one preferred embodiment, the garnish is formed by a method that includes the steps of partially cooking pre-cut french fries, and then mashing or otherwise re-forming the fries into the desired garnish shape for packaging and delivery to the user in a condition suitable for final frying just prior to serving in a hot sandwich. Alternately, the garnish is formed by a method that includes partially cooking large-form potato products, such as whole or large chunks of potatoes or pre-formed potato chunks, sheets or slabs, slicing the partially cooked potato product into french fries, and then mashing or otherwise reforming the partially cooked pre-cut french fries into the desired garnish shape. These embodiments provide the sandwich with an easy to handle, pre-formed garnish most similar to the present practice of mashing french fries on a sandwich, but without the inconvenience associated with loose french fries. These unique garnish products also allow the diner to prepare a sandwich with a french fry garnish without the need to cook individual french fries, or to order a sandwich in a restaurant prepared with the french fry garnish without the need to also order or use separately provided french fries. In alternate embodiments, the shaped garnish unit is provided by (i) pre-cooking shredded potatoes, small chunked potatoes or other pre-formed or pre-cut potato products, then mashing, molding or otherwise re-forming the pre-cooked product into the garnish shape; (ii) molding, extruding and cutting, or otherwise forming a potato-based paste into the garnish shape, or (iii) other potato-product formation techniques to achieve the desired pre-formed garnish shape, surface texture and bite. Finally, the shaped garnish units are partially cooked, further cooked, or fully cooked, and/or refrigerated, frozen or otherwise preserved as desired, and packaged as either single-wrap garnishes, in multi-unit garnish packs, or in bulk garnish packaging for storage, shipment, and delivery to the user.

For use in restaurants, the shaped-potato garnishes are preferably delivered in a condition suitable for grilling or deep-fat frying, or fully cooked for warming in a microwave. For use by individuals, the garnishes are preferably provided in a condition for deep-fat frying, pan frying, baking, broiling, grilling, or warming in a microwave.

Accordingly, hot sandwiches provided with garnishes in accordance herewith provides the diner with a unique cooked potato garnish similar to piled-on french fries, without the inconvenience associated with loose french fries on a sandwich. Moreover, the unique shaped-potato garnishes in accordance herewith enable provision of unique sandwiches having a garnish including additional garnish, condiment, sauce or spice flavoring, without the fuss normally associated therewith. Consequently, for example, the consumer may purchase a sandwich with a fried potato garnish with additional barbecue or vinegar flavor, and thus eliminate the need to purchase a separate barbecue or vinegar flavor source for use on the sandwich.

Figure 15:
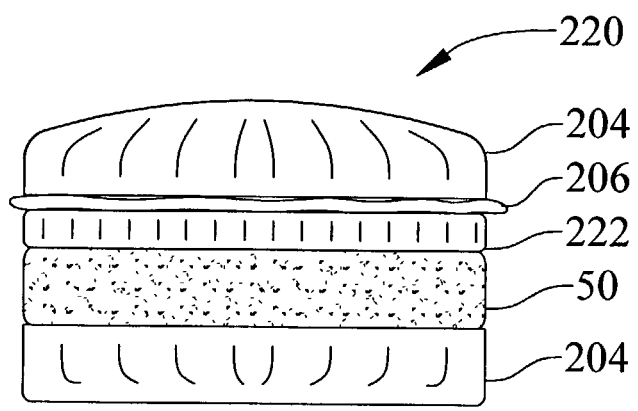
FIG. 15 is a side view of a third embodiment sandwich provided with the shaped-potato sandwich focal-point product shown in FIGS. 16-17.
Figure 16:
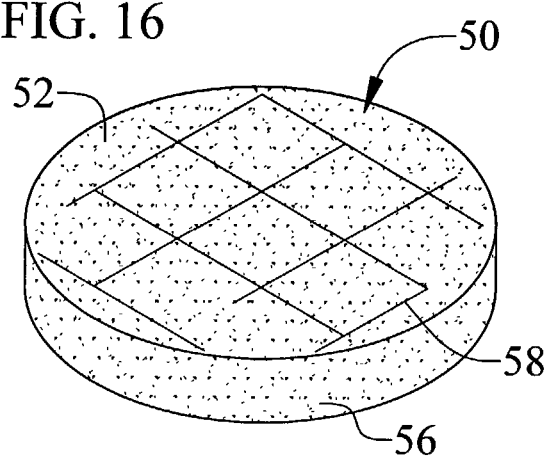
FIGS. 16 and 17 are perspective and side views, respectively, of a shaped-potato sandwich product in the form of a meat substitute, sandwich focal-point product, the top view being similar to the top view of the garnish shown in FIG. 4.
Figure 17:
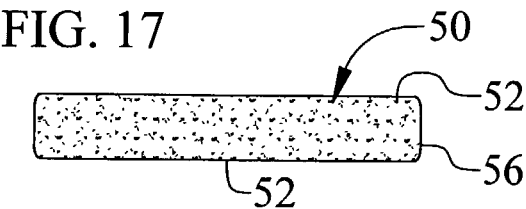
Figure 18:
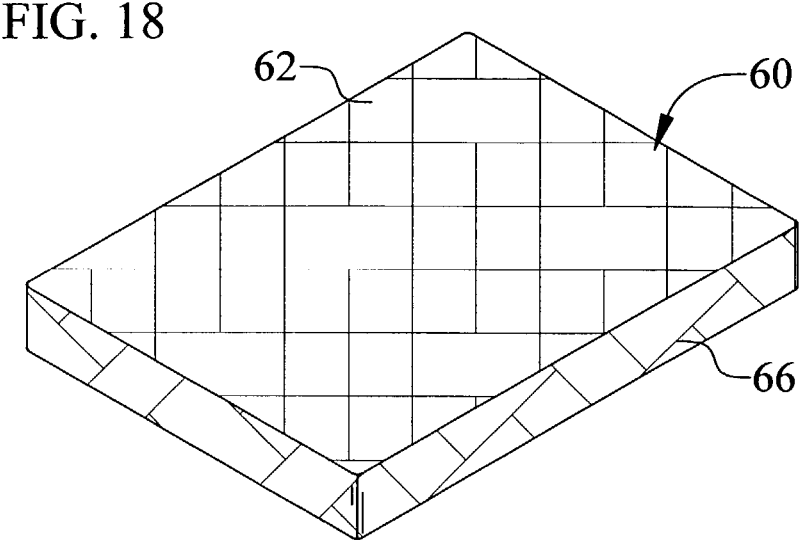
FIGS. 18 and 19 are perspective and side views, respectively, of an alternate sandwich focal-point product, the top view being similar to the top view of the garnish shown in FIG. 13.
Figure 19:
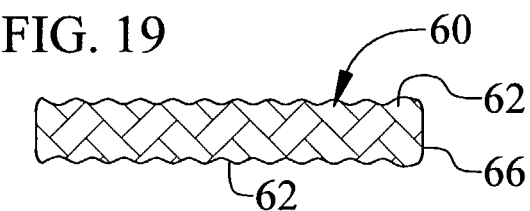

In accordance with another aspect of the invention, a meatless sandwich, such as sandwich 220 shown in FIG. 15, is provided with a shaped-potato sandwich focal point product corresponding to the meat product being represented or substituted thereby. In this instance, the sandwich 220 includes the hamburger bun 204, the lettuce garnish 206 and a tomato or onion garnish slice 222. In carrying out this aspect of the invention, the sandwich 220 further includes a potato burger product 50 suggestive of a conventional hamburger.

Figure 20:
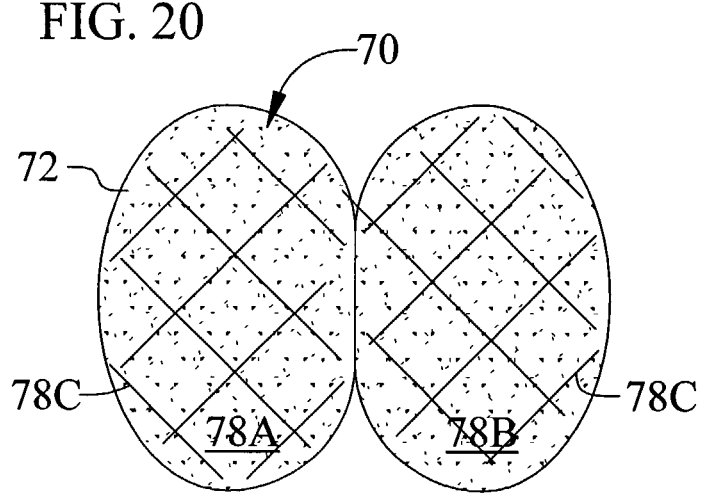
FIGS. 20 and 21 are top and side views, respectively, of a third embodiment sandwich focal-point product.
Figure 21:
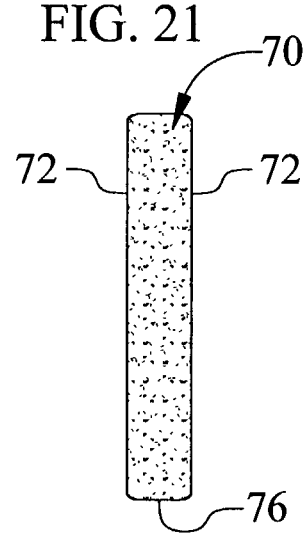

Preferred embodiment focal-point meat substitute potato products in accordance with the invention are shown in the drawings as potato burgers 50 and 60 in FIGS. 16-17 and FIGS. 18-19, respectively, as a potato chop product 70 in FIGS. 20-21, and as potato dog products 80, 90, 100, 110, in FIGS. 22-27. These meat substitute shaped-potato products are provided with a regular shape suggestive of the product being represented thereby, they are flavored corresponding thereto with beef, pork, chicken, turkey or sausage flavoring, and they are optionally provided with additional garnish, condiment, sauce or spice flavoring.

In general, and as discussed in further detail above in connection with the shaped-potato garnish products, the shaped-potato meat substitute products are pre-formed, packaged, and delivered to the user in either a raw, a partially cooked, or a fully cooked, preserved condition. They are pre-formed with a suitable process such as forming, pressing or extruding prepared potato material (e.g., cut potato, mashed potato or potato paste) into the desired product shape. The product units are then dehydrated, cooled, frozen, partially or fully pre-cooked, further cooked, or otherwise processed, and packaged in single-wrap servings, multi-unit packs, or bulk packaging for storage, shipment, and delivery to the user. For use in restaurants, the products are preferably delivered in a condition for grilling or deep-fat frying, or fully pre-cooked for warming in a microwave. For use by individuals, the meat-simulative products are provided in a condition for pan frying, baking, broiling, grilling, deep-fat frying or warming in a microwave.

As indicated above, the potato burger products 50 and 60 shown in FIGS. 16-19 are provided in a form suggestive of conventional hamburgers. More particularly, the potato burgers are established with oppositely facing, substantially parallel top and bottom faces 52, 62 for substantial contacting relation with the bread and/or garnish products in a sandwich, and encircling terminal sides 56, 66 extending between the top and bottom faces to establish the perimeter of the product. The potato burgers are relatively thick, established at a substantially constant thickness of between approximately one-fourth (¼) to five-eights (⅝) inch. The potato burger 50 is hamburger bun sized, characterized as at between approximately three (3) to four and one-half (4½) inches in diameter. The potato burger 60 is sliced bread sized, characterized as at between approximately three (3) to four (4) inches by four (4) to five (5) inches rectangular. The preferred potato burger products are flavored and colored simulating ground beef, and are provided with a surface texture and bite which, when cooked, are reminiscent of cooked ground beef. In this instance, the potato burger 50 is provided with a stippled surface texture suggestive of formed ground beef, and is further provided in a pre-browned condition, with a surface presentation including pre-browned grill markings 58. The potato burger 60 is provided with an alternate waffle or criss-cross surface texture.

The potato chop 70 shown in FIGS. 20-21 is established with top and bottom faces 72 and encircling sides 76, is provided at a substantially constant thickness of between approximately one-fourth (¼) to one-half (½) inch thick, and is sized for use in bun or bread sandwich. The potato chop is further provided in the form of two generally oval portions 78A and 78B connected in the center, with each portion being sized at approximately two (2) inches by four (4) inches suggestive of a butterfly pork chop. The potato chop is further flavored and colored suggestive of pork chops, and is optionally provided in a pre-browned condition or with a surface presentation including grill marks 78C. Additional shaped-potato products provided in accordance with the invention will include products representative of chicken breasts, and breaded fish and chicken patties.

Referring to FIGS. 22-27, there is shown additional unique shaped-potato products sized and shaped suggestive of hot-dogs. The potato dogs are flavored, colored and textured suggestive of beef, pork, chicken or turkey hotdogs. The potato dogs are optionally provided with additional garnish, condiment, sauce or space flavoring such as cheese, smoke, ketchup, mustard, onion or relish flavoring.

Figure 22:
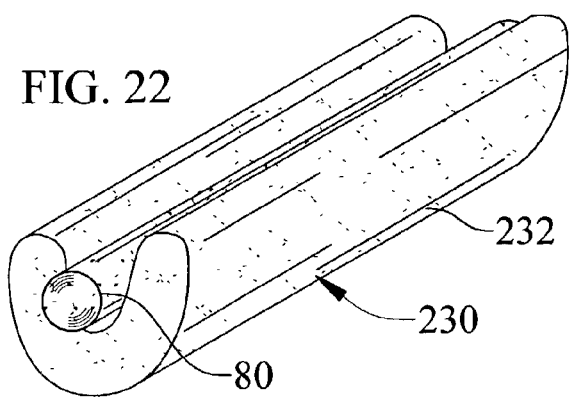
FIG. 22 is a perspective view of a fourth embodiment sandwich provided with the focal-point product shown in FIG. 23.
Figure 23:
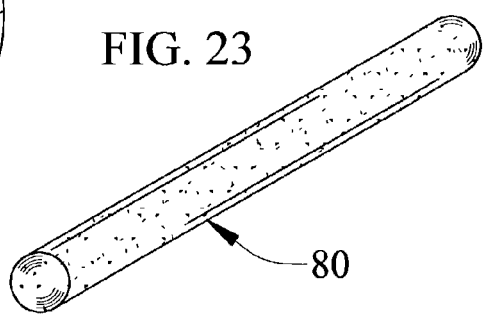
FIG. 23 is a perspective views of a fourth embodiment sandwich focal-point product provided in the form of a shaped potato-dog.
Figure 24:
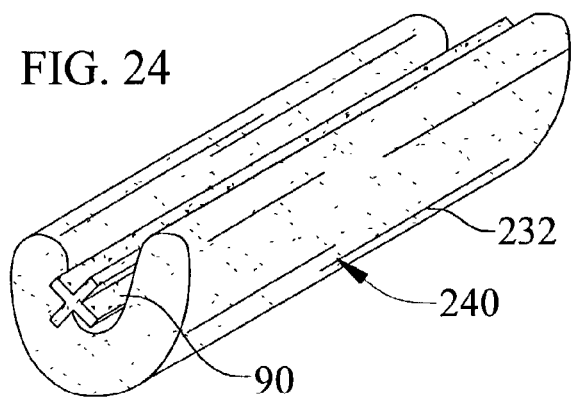
FIG. 24 is a perspective view of a fifth embodiment sandwich provided with the focal-point product shown in FIG. 25.
Figure 25:
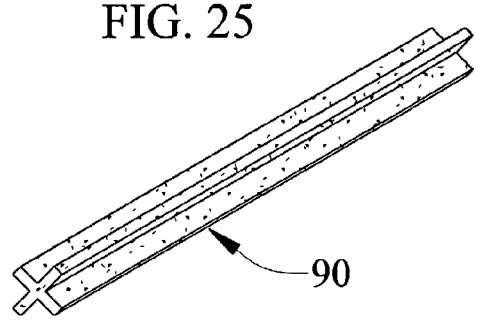
FIGS. 25, 26, and 27 are perspective views of three alternate shaped potato-dog sandwich focal-point products.
Figure 26:
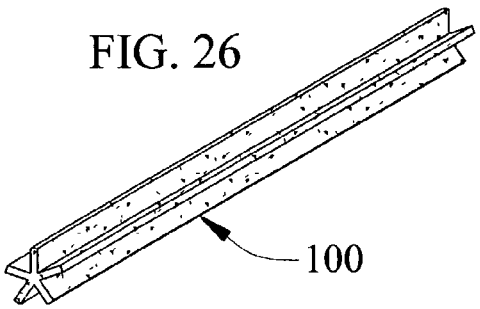
Figure 27:
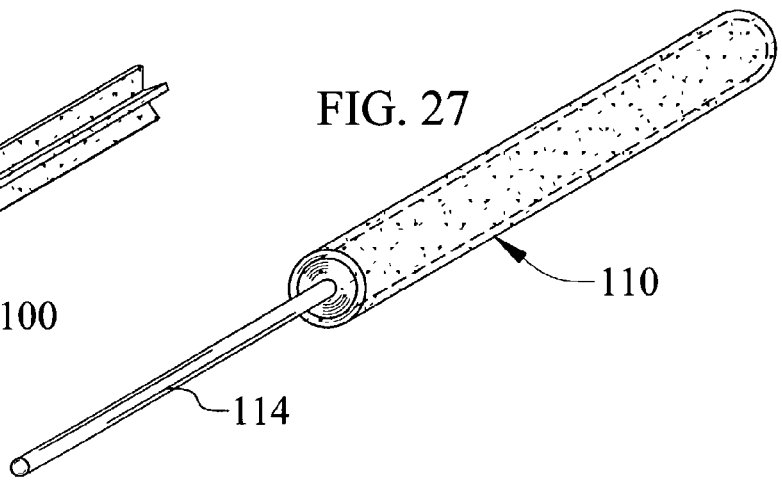

More particularly, there is shown a hotdog bun sandwich 230 in FIG. 22 provided with a potato dog 80 (FIG. 23) that is provided in a form suggestive of a conventional hotdog. In this instance, the potato dog 80 is generally cylindrical, with a substantially constant round cross-section, and is sized for complimentary use with a two-part hotdog bun 232. The potato dog 80 is particularly characterized as provided with a relative constant diameter of between approximately one-half (½) to one (1) inch, and is between approximately five (5) to seven (7), and in certain specialty instances, up to nine (9) inches long. The potato dog 80 is optionally provided with grill marks. Alternate embodiment potato dogs 90 (FIG. 25) and 100 (FIG. 26) are provided with unique "X" (cross) and star cross-sections, respectively, and with the same overall dimensions as potato dog 80. Advantageously, as can be seen in the potato dog sandwich 240 shown in FIG. 24, the valleys in such configured potato dog products assist in holding condiments such as ketchup, mustard, onion and relish on the sandwich. Yet another alternate embodiment potato dog 110 is shown in FIG. 27 in the form of a wrapped dog product. In this instance, the potato dog includes an edible wrap 112 preferably made from a potato-based composition, or alternately from a flour of corn-meal composition. The wrap is provided with condiment flavor for use in hotdog bun, and/or with a potato, bread or corn-meal flavor for presentation on a stick 114 as a potato "corn dog" product. In this instance, the wrap is provided with thickness of between approximately one-eight (⅛) to three-eights (⅜) inch, for an overall diameter of approximately three-fourth (¾) to one and one-fourth (¼) inches.

From the foregoing, it will be apparent that the present invention brings to the culinary arts unique sandwich products, including unique shaped-potato garnishes and sandwich focal-point products. The shaped-potato garnishes enable provision of unique sandwiches with a fried potato content in the form of a single garnish that reduces the inconvenience and other disadvantages associated with the conventional practice of smashing a pile of french fries in a sandwich, and that further enables presentation of unique sandwich flavor combinations. And sandwiches provided with a shaped-potato sandwich focal point product in accordance with the invention provides the diner with a meatless sandwich, with generally pleasing potato-base flavor and possible additional unique flavoring combinations, without the objectionable taste and odor commonly associated with prior meat-substitute soy-based products. Accordingly, the present invention enhances the variety of sandwiches available to the consuming public.

I claim:

1. A sandwich product comprising:
    two bread portions;
    a generally flat shaped-potato product disposed between said bread portions; said shaped-potato product having a substantially constant cross-section between top and bottom faces, and being sized to extend to proximate the perimeter of said bread portions; and
    wherein the shaped-potato product is formed from partially-cooked pre-cut french fries that have been pressed together in a deliberate criss-cross pattern such that the shaped-potato product is a collection of french fries that are held together without assistance from the two bread portions.

2. The sandwich product of claim 1 in which the shaped-potato product is further characterized as having a generally closed form across said cross-section.

3. The sandwich product of claim 1 in which the shaped-potato product further includes a flavor selected from the group consisting of beef, pork, chicken, turkey, sausage and fish.

4. The sandwich product of claim 1 wherein the shaped potato product comprises:
    (i) opposing, substantially parallel, substantially closed-form top and bottom faces sized at one of
        (a) between approximately three (3) to four and one-half (4-½) inches in diameter, and
        (b) between approximately three (3) to four (4) inches by four (4) to five (5) inches, and
    (ii) encircling terminal sides extending between said top and bottom faces and being sized at between approximately one-eight (⅛) to five-eighths (⅝) inch.

5. The sandwich product of claim 4 in which the sides of the shaped potato product are sized at between approximately one-fourth (¼) to five-eights (⅝) inch thick, and in which the potato product further includes a flavor selected from the group consisting of beef, pork, chicken, turkey, sausage and fish.

6. The sandwich product of claim 4 further comprising a shaped meat product sized to substantially fill said bread portions and located between one of said bread portions and said potato product, and in which said sides of said potato product are sized at between approximately one-eight (⅛) to three-eighths (⅜) inch thick.

7. The sandwich product of claim 1 in which the potato product further includes a flavor selected from the group consisting of as lettuce, tomato, onion, pickle, relish, cheese, smoke, salsa, chili, sour cream, ketchup, mustard, bacon, horseradish, barbecue, mayonnaise, salt, pepper, honey, garlic, lemon, parmesan, butter, malt and vinegar.

8. The sandwich product of claim 1 in which the shaped potato product is further provided with a pre-browned surface presentation with grill-marks.

9. A sandwich product comprising:
a generally flat shaped potato product having a pre-formed shape including:
(i) opposing, substantially parallel top and bottom faces;
(ii) encircling terminal sides extending between said top and bottom faces;
(iii) presentation suggestive of a pile of mashed french fries, with the french fries deliberately arranged in a generally transverse pattern; and
wherein the shaped potato product is formed from partially-cooked pre-cut french fries that have been pressed together such that the potato product is a collection of french fries.

10. The sandwich product of claim 9, wherein the opposing, substantially parallel top and bottom faces are sized at one of:
(a) between approximately three (3) to four and one-half (4-½) inches in diameter, and
(b) between approximately three (3) to four (4) inches by four (4) to five (5) inches; and
wherein the encircling terminal sides extending between said top and bottom faces are sized at between approximately one-fourth (¼) to five-eights (⅝) inch.

11. The sandwich of claim 9 in which the shaped potato product is further provided with a pre-browned surface presentation with grill-marks.

12. The sandwich product of claim 9 in which the shaped potato product further includes a flavor selected from the group consisting of as lettuce, tomato, onion, pickle, relish, cheese, smoke, salsa, chili, sour cream, ketchup, mustard, bacon, horseradish, barbecue, mayonnaise, salt, pepper, honey, garlic, lemon, parmesan, butter, malt and vinegar.

13. A sandwich product comprising:
a generally flat shaped potato product having a pre-formed shape including:
(i) opposing, substantially parallel top and bottom faces;
(ii) encircling terminal sides extending between said top and bottom faces;
(iii) presentation suggestive of a pile of mashed french fries deliberately arranged in a generally regular pattern;
wherein the shaped potato product is formed from partially-cooked pre-cut french fries that have been pressed together such that the potato product is a collection of french fries; and, wherein the generally regular pattern comprises an arrangement of fries arranged transverse to one another in a criss-cross pattern.

14. A sandwich product comprising:
a generally flat shaped potato product having a pre-formed shape including:
(i) opposing, substantially parallel top and bottom faces;
(ii) encircling terminal sides extending between said top and bottom faces;
(iii) presentation suggestive of a pile of mashed french fries deliberately arranged in a generally regular pattern;
wherein the shaped potato product if formed from partially-cooked pre-cut french fries that have been pressed together such that the potato product is a collection of french fries; and wherein the generally regular pattern comprises an arrangement of fries arranged in a waffle-like pattern.

15. The sandwich product of claim 9 in which the shaped-potato product further includes a flavor selected from the group consisting of beef, pork, chicken, turkey, sausage and fish.

16. A method for making a sandwich product comprising:
partially cooking pre-cut french fries into a pre-cooked french fries product;
re-forming the pre-cooked french fries product into a generally flat potato product having a pre-formed shape including a presentation suggestive of a pile of mashed french fries, with the french fries deliberately arranged in a generally transverse pattern; and
further cooking said pre-formed shaped potato product.

17. A method for making a sandwich product comprising:
partially cooking pre-cut french fries into a pre-cooked french fries product;
re-forming the pre-cooked french fries product into a generally flat potato product having a pre-formed shape including a presentation suggestive of a pile of mashed french fries deliberately arranged in a generally regular pattern;
further cooking said pre-formed shaped potato product; and wherein the generally regular pattern comprises an arrangement of fries arranged transverse to one another in a criss-cross pattern.

18. The method of claim 16 further comprising partially cooking a large-form potato product as said potato product and slicing the partially cooked large-form potato product into french fries.

19. The method of claim 16, wherein the step of re-forming into a pre-formed shape is accomplished by one of pressing or extruding the pre-cooked potato product.

20. A method for making a sandwich product comprising:
partially cooking pre-cut french fries into a pre-cooked french fries product;
re-forming the pre-cooked french fries product into a generally flat potato product having a re-formed shape including a presentation suggestive of a pile of mashed french fries deliberately arranged in a generally regular pattern;
further cooking said pre-formed shaped potato product; and, wherein the generally regular pattern comprises an arrangement of fries in a waffle-like pattern.

21. The method of claim 16 in which the shaped potato product is further provided with a pre-browned surface presentation with grill-marks.

\* \* \* \* \*